(12) United States Patent
Losno et al.

(10) Patent No.: US 11,498,051 B2
(45) Date of Patent: Nov. 15, 2022

(54) METHOD FOR PREPARING A MONOLITHIC STATIONARY PHASE, ASSOCIATED METHOD FOR PRODUCING A CHROMATOGRAPHY COLUMN AND ASSOCIATED SEPARATION METHOD

(71) Applicant: COMMISSARIAT A L'ENERGIE ATOMIQUE ET AUX ENERGIES ALTERNATIVES, Paris (FR)

(72) Inventors: Marion Losno, Paris (FR); Clarisse Mariet, Montrouge (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 365 days.

(21) Appl. No.: 16/627,536

(22) PCT Filed: Jul. 5, 2018

(86) PCT No.: PCT/FR2018/051676
§ 371 (c)(1),
(2) Date: Dec. 30, 2019

(87) PCT Pub. No.: WO2019/008278
PCT Pub. Date: Jan. 10, 2019

(65) Prior Publication Data
US 2020/0215514 A1    Jul. 9, 2020

(30) Foreign Application Priority Data

Jul. 6, 2017 (FR) .................................. 17 56393

(51) Int. Cl.
*B01J 20/286* (2006.01)
*B01J 20/32* (2006.01)
*G01N 30/60* (2006.01)

(52) U.S. Cl.
CPC .......... *B01J 20/286* (2013.01); *B01J 20/321* (2013.01); *G01N 30/60* (2013.01); *B01J 2220/82* (2013.01); *B01J 2220/86* (2013.01)

(58) Field of Classification Search
CPC ............. B01J 20/28097; B01J 20/286; B01J 2220/82; B01J 2220/84; B01J 2220/86; G01N 2030/567; G01N 30/02
See application file for complete search history.

(56) References Cited

U.S. PATENT DOCUMENTS

| 2004/0101442 | A1* | 5/2004 | Frechet ............. B01L 3/502707 422/506 |
| 2007/0015179 | A1 | 1/2007 | Klapperich et al. |
| 2014/0178252 | A1 | 6/2014 | Hatch et al. |

FOREIGN PATENT DOCUMENTS

FR    2 978 153 A1    1/2013

OTHER PUBLICATIONS

Ro et al. "Plastic microchip liquid chromatography-matrix-assisted laser desorption/ionization mass spectrometry using monolithic columns" (J. Chromatogr. A 1111, 2006, p. 40-47) (Year: 2006).*
Ladner et al. "New "one-step" method for the simultaneous synthesis and anchoring of organic monolith inside COC microchip channels" (Lab Chip, 12, 2012, p. 1680-1685) (Year: 2012).*
Ro et al. "Plastic microchip liquid chromatography-matrix-assisted laser desorption/ionization mass spectrometry using monolithic columns" Journal of Chromatography A, 2006, 1111, p. 40-47 (Year: 2006).*
Ladner et al. "New "one-step" method for the simultaneous synthesis and anchoring of organic monolith inside COC microchip channels" Lab on a Chip, 2012, 12, p. 1680-1685 (Year: 2012).*
Stachowiak et al. "Fabrication of porous polymer monoliths covalently attached to the walls of channels in plastic microdevices" Electrophoresis, 2003, 24, p. 3689-3693 (Year: 2003).*
International Search Report dated Oct. 23, 2018 in PCT/FR2018/051676 filed on Jul. 5, 2018, 3 pages.
French Preliminary Search Report dated Feb. 22, 2018 in French Application 17 56393 filed on Jul. 6, 2017, 2 pages.
Ro, K. W. et al., "Plastic microchip liquid chromatography-matrix-assisted laser desorption/ionization mass spectrometry using monolithic columns," Journal of Chromatography A, vol. 1111, 2006, pp. 40-47, XP024968003.
Stachowiak, T. B. et al., "Fabrication of porous polymer monoliths covalently attached to the walls of channels in plastic microdevices," Electrophoresis, vol. 24, 2003, pp. 3689-3693, XP009100062.
Ladner Y. et al., "New "one-step" method for the simultaneous synthesis and anchoring of organic monolith inside COC microchip channels," Lab Chip, vol. 12, 2012, pp. 1680-1685, XP055061295.

(Continued)

*Primary Examiner* — Ryan B Huang
(74) *Attorney, Agent, or Firm* — Oblon, McClelland, Maier & Neustadt, L.L.P.

(57) ABSTRACT

The invention relates to a method for preparing a monolithic stationary phase in the interior volume of a chromatography column made of thermoplastic polymer. This method comprises the following steps: (i) modifying the inner wall of the chromatography column by implementing the following steps: (a) preparing a polymerizable anchoring composition comprising at least one particular methacrylate monomer, one or more solvents and 2,2-dimethoxy-2-phenylacetophenone, (b) depositing, on the inner wall of the column, the polymerizable anchoring composition prepared in step (a), and (c) polymerizing the polymerizable anchoring composition by irradiation with ultraviolet radiation; (ii) introducing, into the interior volume of the column, a polymerizable monolith synthesis composition comprising first and second particular (meth)acrylate monomers, one or more pore-forming agents and a free-radical polymerization initiator; and (iii) polymerizing the polymerizable monolith synthesis composition. The invention also relates to a method for producing a chromatography column comprising such a monolithic stationary phase and to a chromatographic separation method using such a column.

15 Claims, 1 Drawing Sheet

(56) References Cited

OTHER PUBLICATIONS

Burke J. M. et al., "A novel surface modification technique for forming porous polymer monoliths in poly(dimethylsiloxane)," Biomicrofluidics, vol. 6, 2012, 016506-1-016506-10.

* cited by examiner

METHOD FOR PREPARING A MONOLITHIC STATIONARY PHASE, ASSOCIATED METHOD FOR PRODUCING A CHROMATOGRAPHY COLUMN AND ASSOCIATED SEPARATION METHOD

TECHNICAL FIELD

The present invention relates to a method for preparing a monolithic stationary phase intended inter alia to equip a chromatography column in thermoplastic polymer, in particular in cyclic olefin copolymer.

The present invention also relates to a method for producing a chromatography column comprising such a monolithic stationary phase.

Finally, the invention relates to a method for chromatographic separation of elements contained in an acid aqueous solution, this method using a chromatography column produced with the preceding method.

State of the Prior Art

The last few years have witnessed the development of microfluidic devices such as miniaturized analytical systems, also called micro total analysis systems and abbreviated to MicroTAS.

This miniaturization of analytical systems first meets the desire to develop portable systems which integrate the steps of extraction, separation and detection making it possible to envisage field analyses. It also meets laboratory needs in terms of cost reduction and reduced volumes of reagents and samples to be treated. Said miniaturized analytical systems can additionally be parallelized thereby allowing the management of a large flow of samples whilst reducing analysis and handling times.

The retention of an element is inversely proportional to the square of the diameter of separation columns. On this account, even if the volumes of samples to be analyzed are reduced, high sensitivity can nevertheless be reached with miniaturized systems.

In the present invention, more particular focus is placed on miniaturized chromatography systems using stationary phases formed by organic monoliths called "monolithic stationary phases" in the remainder of the present description.

These monolithic stationary phases are conventionally formed by a continuous, porous three-dimensional structure composed of interconnected nodules, and which is functionalized as a function of the type of separation or of extraction to be performed.

The ease of preparation of these monolithic stationary phases from precursors contained in polymerizable compositions in liquid form within miniaturized columns or channels has fostered the development of this type of stationary phases.

These polymerizable compositions allow, after polymerization, the forming of the monolithic stationary phase of these columns or channels. In the remainder of this description, they are designated by the expression "polymerizable monolith synthesis composition(s)".

More particularly, the method for preparing said monolithic stationary phases within the interior volume of a chromatography column comprises the following steps:

(1) preparing a polymerizable monolith synthesis composition;

(2) placing the polymerizable monolith synthesis composition thus prepared in the interior volume of the column; and (3) performing in situ radical polymerization of the polymerizable monolith synthesis composition.

The polymerizable monolith synthesis composition comprises one or more organic monomers, one or more pore-forming agents and a radical polymerization initiator.

After charging the interior volume of the column with the polymerizable monolith synthesis composition, in situ polymerization of this monolith synthesis composition is carried out, via thermal or photochemical route, e.g. by applying ultraviolet radiation, to obtain the monolithic stationary phase. It is to be noted that the photochemical route has the advantage of being distinctly faster than the thermal route and is additionally able to be localized.

Therefore, the preparation method allows the monolithic stationary phase to be formed directly inside the column, the capillary or even the microchannel.

The problem arises however of anchoring this monolithic stationary phase inside the column. Said anchoring to the inner wall of the column is essential, not only to prevent entrainment, and hence displacement, of the monolithic stationary phase inside the column when the mobile phase is circulated, but also to ensure the chromatographic performance of miniaturized chromatography systems equipped with such monolithic stationary phases.

This anchoring of the stationary phase to the inner wall of the column is directly related to the constituent material of the column.

The chief constituent materials of columns can be inorganic, in particular glass, e.g. fused silica, quartz or borosilicate glass.

Columns can also be made from polymer materials. Among the polymers frequently used, mention can be made of polydimethylsiloxane (PDMS), which is an organic-mineral polymer of the siloxane family, and numerous thermoplastic polymers including poly(methyl methacrylate) (PMMA), polyethylene (PE), polypropylene (PP) or cyclic olefin copolymers (COC).

If the material of the column, capillary or microchannel is in glass or PDMS, it is necessary to carry out a functionalization step of the inner wall of this column, capillary or microchannel, to allow later anchoring of the monolithic stationary phase. This functionalization step conventionally leads to a silanization reaction whereby the siloxane bridges of the inner wall are changed to silanol groups.

However, said functionalization step is of no effect for columns made of thermoplastic polymer such as COC columns.

To enable the forming of the monolithic stationary phase inside a COC column and anchoring thereof to the inner wall of this column, the publication by Y. Ladner et al. ("New "one-step" method for the simultaneous synthesis and anchoring of organic monolith inside COC microchip channels", Lab Chip, 2012, 12, 1680-1685), referenced [1] in the remainder of the present description, proposes a preparation method of the aforementioned type using particular polymerizable compositions allowing the synthesis and grafting via covalent bonding of the monolithic stationary phase to the inner wall of a COC column.

The particular polymerizable compositions described in publication [1] comprise at least one acrylate or methacrylate monomer, hereafter designated by the expression "(meth)acrylate monomer", several pore-forming agents and a radical polymerization initiator selected from among benzoin methyl ether (BME) and azobisisobutyronitrile (AIBN).

More specifically, the (meth)acrylate monomers contained in the different polymerizable compositions described in publication [1] are:
  hexyl acrylate (HA) and 1,3-butanediol diacrylate (BDDA),
  glycidyl methacrylate (GMA) and ethylene glycol dimethacrylate (EGDMA), or
  polyethylene glycol methacrylate (PEGMA).

In document FR 2 978 153, referenced [2], some of the examples of polymerizable compositions described in publication [1] are found. It is to be noted however that document [2] broadens the list of radical polymerization initiators able to be used to prepare stationary phases intended for miniaturized analytical systems. For example, in addition to BME and AIBN, document [2] describes the use of derivatives of benzoin ethers, of derivatives of benzylketal, of alkylphenones or of thioxanthones.

However, document [2] indicates that the monomers, pore-forming agents and radical polymerization initiator forming the polymerizable composition, and the respective proportions thereof, must be adapted by persons skilled in the art to allow the simultaneous obtaining of synthesis of the stationary phase and anchoring of this stationary phase onto the inner wall of the column.

More particularly, to improve resistance to pressure, and thereby anchoring of the stationary phase onto the inner wall of the column as well as chromatographic performance, document [2] specifies that the mass proportions of radical polymerization initiator are dependent upon the chosen initiator and must be adapted as a function of this initiator and of the chosen monolithic stationary phase.

As a result, the benefit that could be expected from a method such as the one described in publication [1] and in document [2] which proposes synthesizing and anchoring, in a single step, a monolithic stationary phase inside a COC column, is cancelled out by the multiplication of preparatory tests that need to be carried out to select the monomer(s), pore-forming agent(s) and radical polymerization initiator forming the polymerizable composition as well as the respective proportions of each of these compounds for a given monolithic stationary phase.

Moreover, while the chromatographic separations of polycyclic aromatic hydrocarbons, and of anthracene in particular, reported in publication [1] and document [2] have proved to be satisfactory, it is observed that columns equipped with the monolithic stationary phases described in these documents do not allow the separation of some elements, in particular when these elements are contained in a liquid phase consisting of an aqueous solution comprising nitric acid in strong concentrations. It is observed that the circulation of a liquid phase formed of said acid aqueous solution causes degradation, even detachment, of the anchoring of the monolithic stationary phase from the inner wall of the COC column, thereby making this column unable to be used for the chromatographic separation in progress and evidently for subsequent chromatographic separations.

It is therefore the objective of the present invention to overcome the disadvantages of the prior art and to propose a method for preparing a monolithic stationary phase which is able to be formed directly inside a thermoplastic polymer column, and in such manner that the anchoring performance of this monolithic stationary phase on the inner wall of this column is able to withstand both the pressures that are applied within this column, in particular when this column is intended to equip miniaturized analytical systems, and the circulation of a liquid phase consisting of an aqueous solution with concentration of acid(s).

A further objective of the invention is to propose a method for producing a chromatography column in thermoplastic polymer and comprising a monolithic stationary phase, which is able to be used for repeatable extraction and/or separation of elements contained in concentrated acid solutions, such as solutions comprising nitric acid or hydrochloric acid in strong concentrations.

More generally, it is a further objective of the invention to propose a method for modifying the surface of a substrate formed of thermoplastic polymer, and of COC in particular, with which it is possible to functionalize this surface with a view to subsequent anchoring, e.g. anchoring via grafting, via covalent bonding of a monolithic structure, the substrate thus modified having improved chemical resistance allowing use thereof for extractions and/or separations of elements contained in the aforementioned concentrated acid solutions.

DESCRIPTION OF THE INVENTION

The objectives set forth above and others are reached first with a method to modify a surface of a substrate formed of a thermoplastic polymer, this method comprising the following successive steps:
  (a) preparing a polymerizable anchoring composition comprising:
    at least one (meth)acrylate monomer,
    one or more solvents, and
    a radical polymerization initiator,
  (b) depositing, on the surface of the substrate, the polymerizable anchoring composition prepared at step (a), and
  (c) polymerizing the polymerizable anchoring composition via ultraviolet irradiation.

According to the invention, the (meth)acrylate monomer is selected from among ethylene glycol dimethacrylate (EGDMA), 1,4-butanediol diacrylate (BDA), triethylene glycol dimethacrylate (TEGDMA) and trimethylolpropane trimethacrylate (TMPTMA), and the radical polymerization initiator is 2,2-dimethoxy-2-phenylacetophenone (DMPA or DMPAP).

The polymerizable anchoring composition is formed by the selection of this or these particular (meth)acrylates monomers, in combination with the solvent(s) and DMPA as radical polymerization initiator. This polymerizable anchoring composition therefore allows easy functionalization of a substrate in thermoplastic polymer with a view to later grafting, e.g. of a monolithic three-dimensional porous structure. The assembly formed by the substrate and the layer, which is obtained by polymerization of the polymerizable anchoring composition and which is grafted via covalent bonding onto said substrate, exhibits high-performing chemical resistance, in particular when this assembly is placed in contact with a concentrated solution of acid(s).

This finding is all the more unexpected and surprising if reference is made to the teaching of the publication by J. M. Burke et al. ("*A novel surface modification technique for forming porous polymer monoliths in poly(dimethylsiloxane)*", Biomicrofluidics, 2012, 6, 016506), referenced [3].

The authors of this publication [3] actually propose a method for modifying the surface of a substrate which is not in thermoplastic polymer but in PDMS. This method comprises:

a first step to impregnate this substrate with DMPA, a second step to impregnate this DMPA-impregnated substrate with a solution comprising (meth)acrylate monomers, and a third step to irradiate, via ultraviolet radiation at 365 nm, this substrate successively impregnated with DMPA and the solution of (meth)acrylate monomers.

At the third step, polymerization of the (meth)acrylate monomers is carried out within the PDMS substrate. The surface of the substrate in PDMS is thereby modified and provided with functional groups which allow the envisaging of subsequent anchoring of a monolithic structure, for example by contacting this surface of the modified substrate with a polymerizable composition intended to form this monolithic structure, followed by polymerization of this composition.

If the radical polymerization initiator used in the method described in this publication [3] is DMPA, this method requires the impregnation of this initiator in the substrate. However, while the impregnation of a substrate formed of the organo-mineral PDMS polymer is feasible, that of a substrate formed of a thermoplastic polymer of PMMA, PE, PP or COC type is impossible.

Step (a) of preparing the polymerizable anchoring composition used in the modification method of the invention can be carried out simply by mixing the (meth)acrylate monomer(s), solvent(s) and DMPA.

As previously indicated, the polymerizable anchoring composition comprises at least one (meth)acrylate monomer, this (meth)acrylate monomer being selected from among ethylene glycol dimethacrylate (EGDMA), 1,4-butanediol diacrylate (BDA), triethylene glycol dimethacrylate (TEGDMA) and trimethylolpropane trimethacrylate (TMPTMA). This polymerizable anchoring composition is therefore able to comprise only a single (meth)acrylate monomer from among the (meth)acrylates monomers just cited. Conversely, the polymerizable anchoring composition may comprise two or three of these (meth)acrylate monomers, even the four (meth)acrylate monomers.

In one advantageous variant of this method, the (meth)acrylate monomer is ethylene glycol dimethacrylate (EGDMA).

The polymerizable anchoring composition used in the method of the invention also comprises one or more solvents.

This or these solvents particularly allow solubilization of all the compounds forming the polymerizable anchoring composition, namely the (meth)acrylate monomer(s) mentioned above and DMPA.

While, in one advantageous embodiment, this polymerizable anchoring composition only comprises one solvent, there is nothing to prevent the envisaged use of a mixture of two, three or even more solvents.

The solvents able to be used for preparing the polymerizable anchoring composition can particularly be selected from among methanol, ethanol, 1-propanol, 1,4-butanediol, cyclohexanol, 1-decanol, acetonitrile, toluene and iso-octane.

The solvent is advantageously ethanol.

In one variant of the modification method of the invention, the mass proportion of the solvent(s) relative to the total mass of the polymerizable anchoring composition is between 50 mass % and 90 mass %.

In more particularly advantageous manner, the mass proportion of the solvent(s) relative to the total mass of the polymerizable anchoring composition is between 60 mass % and 80 mass %.

It is specified that the expression "between . . . and . . . " just cited and which is used in the present application is to be construed as defining not only the values within the range but also the limit values of this range.

The polymerizable anchoring composition used in the modification method of the invention also comprises 2,2-dimethoxy-2-phenylacetophenone (DMPA) as radical polymerization initiator.

In one variant of the modification method of the invention, the mass proportion of DMPA, relative to the total mass of the polymerizable anchoring composition is between 5 mass % and 15 mass %.

In one more particularly advantageous variant, the mass proportion of DMPA, relative to the total mass of the polymerizable anchoring composition, is between 6 mass % and 10 mass %.

Step (b) of depositing, on the substrate surface, the polymerizable anchoring composition used in the modification method of the invention can be conducted using any technique allowing the contacting of this polymerizable anchoring composition with the substrate surface.

This technique will evidently be adapted to the conformation of the substrate and of the surface under consideration of this substrate.

For example, if the substrate is formed of an open structure such as a plate or film, the surface of the substrate can be coated with a very thin layer of the polymerizable anchoring composition applied by means of a brush.

If the substrate is formed of a closed structure such as a microchannel or capillary, the polymerizable anchoring composition is first placed in this microchannel or capillary so as to fill, at least in part, the interior volume of this closed structure. In particular, it can be envisaged to circulate the polymerizable anchoring composition within the interior volume of the microchannel or capillary. At a second stage, the excess of polymerizable anchoring composition is evacuated so as only to leave behind a thin layer of polymerizable anchoring composition on the inner wall of the microchannel or capillary, this inner wall corresponding to the surface of the substrate.

Step (c) of polymerizing the polymerizable anchoring composition used in the modification method of the invention is chain radical polymerization initiated by DMPA.

This polymerization is photo-polymerization, i.e. polymerization performed by ultraviolet irradiation (UV) of the polymerizable anchoring composition prepared at step (a) then deposited at step (b) on the surface of the substrate.

The thermoplastic polymer forming the substrate is preferably transparent to the wavelength of UV radiation applied at polymerization step (c). By "transparent", it is meant that the thermoplastic polymer has absorbance, denoted A, such that A≤0.3 at the wavelength of UV radiation applied at step (c).

In one variant of the modification method of the invention, the wavelength of the UV radiation applied at step (c) is between 320 nm and 400 nm. This wavelength of UV radiation is advantageously between 350 nm and 380 nm, and more preferably between 355 nm and 370 nm.

In one variant of the modification method of the invention, the UV irradiation time is between 5 min and 80 min, and advantageously between 15 min and 70 min.

These irradiation times are to be adapted to the conformation of the substrate.

For example, if the substrate is formed of an open structure such as a plate or film, the UV irradiation time can be between 5 min and 30 min, and advantageously between 15 min and 25 min.

If the substrate is formed by a closed structure such as a microchannel or capillary, the UV irradiation time can be between 40 min and 80 min, and advantageously between 50 min and 70 min.

In one advantageous variant of the modification method of the invention, the thermoplastic polymer of the substrate is selected from among a poly(methyl methacrylate) (PMMA), a polyethylene (PE), a polypropylene (PP) and a cyclic olefin copolymer (COC).

In one preferred variant, the thermoplastic polymer of the substrate is a cyclic olefin copolymer (COC).

The present invention secondly relates to a method for preparing a monolithic stationary phase within the interior volume of a chromatography column, and in particular within the interior volume of a separation or extraction chromatography column.

According to the invention, this preparation method comprises the following successive steps:
(i) modifying the surface of the substrate by implementing the modification method such as defined above, the surface of the substrate being formed by the inner wall of the chromatography column;
(ii) placing a polymerizable monolith synthesis composition in the interior volume of the chromatography column, the polymerizable monolith synthesis composition comprising:
  a first (meth)acrylate monomer selected from among ethylene glycol dimethacrylate, 1,4-butanediol diacrylate, triethylene glycol dimethacrylate and trimethylolpropane trimethacrylate,
  a second meth(acrylate) monomer selected from among allyl methacrylate, glycidyl methacrylate, lauryl methacrylate, butyl methacrylate, 2-hydroxyethyl methacrylate, polyethylene glycol di(meth)acrylate, bisphenol A-glycidyl methacrylate, and hexyl acrylate,
  one or more pore-forming agents, and
  a radical polymerization initiator; and
(iii) polymerizing the polymerizable monolith synthesis composition.

In other words, the method for preparing a monolithic stationary phase within the interior volume of a chromatography column comprises the following successive steps:
(i) modifying the inner wall of the chromatography column by implementing the following successive steps (a) to (c):
  (a) preparing a polymerizable anchoring composition comprising:
    at least one monomer selected from among ethylene glycol dimethacrylate, 1,4-butanediol diacrylate, triethylene glycol dimethacrylate and trimethylolpropane trimethacrylate,
    one or more solvents, and
    2,2-dimethoxy-2-phenylacetophenone (DMPA),
  (b) depositing, on the inner wall of the chromatography column, the polymerizable anchoring composition prepared at step (a), and
  (c) polymerizing the polymerizable anchoring composition via UV radiation;
(ii) placing a polymerizable monolith synthesis composition in the interior volume of a chromatography column, the polymerizable monolith synthesis composition comprising:
  a first (meth)acrylate monomer selected from among ethylene glycol dimethacrylate, 1,4-butanediol diacrylate, triethylene glycol dimethacrylate and trimethylolpropane trimethacrylate,
  a second meth(acrylate) monomer selected from among allyl methacrylate, glycidyl methacrylate, lauryl methacrylate, butyl methacrylate, 2-hydroxyethyl methacrylate, polyethylene glycol di(meth)acrylate, bisphenol A-glycidyl methacrylate, and hexyl acrylate,
  one or more pore-forming agents, and
  a radical polymerization initiator; and
(iii) polymerizing the polymerizable monolith synthesis composition.

With the method of the invention it is possible, within the interior volume of a chromatography column in thermoplastic polymer, to prepare a monolithic stationary phase which is solidly anchored, via covalent grafting, onto the inner wall of this column as modified after step (i).

This anchoring of the monolithic stationary phase particularly exhibits high-performing chemical resistance preventing degradation thereof, in particular when the monolithic stationary phase is placed in contact with a concentrated solution of acid(s).

The anchoring of the monolithic stationary phase to the modified inner wall of the chromatography column is reinforced through the use of monomers of the same chemical family, in this case (meth)acrylate monomers.

In this method for preparing a monolithic stationary phase of the invention, steps (a) to (c), which form step (i), are carried out using the modification method such as defined above, it being specified that the advantageous characteristics of this modification method, such as those related to the monomer(s), solvent(s) and DMPA, related to their respective mass proportions and/or related to steps (a) and (c) as such, can be taken alone or in combination.

As previously indicated, step (b) of depositing the polymerizable anchoring composition prepared at step (a) on the inner wall of the column can be performed in particular by at least one filling of the interior volume of the chromatography column with this polymerizable anchoring composition, followed by evacuation of this polymerizable anchoring composition so as only to maintain a film on the walls.

Step (c) is then carried out to photo-polymerize the polymerizable anchoring composition inside this column (in situ).

After step (c) or (i), a chromatography column is obtained having a modified and functionalized inner wall.

The preparation method of the invention comprises, after this step (i), a step (ii) wherein a polymerizable monolith synthesis composition is placed in the interior volume of the column.

The polymerizable monolith synthesis composition comprises a first and a second (meth)acrylate monomers, one or more pore-forming agents and a radical polymerization initiator.

The first (meth)acrylate monomer is selected from among the (meth)acrylate monomers already described in the foregoing in connection with the polymerizable anchoring composition prepared at step (a) of the modification method of the invention. Therefore, this first (meth)acrylate monomer is selected from among ethylene glycol dimethacrylate (EGDMA), 1,4-butanediol diacrylate (BDA), triethylene glycol dimethacrylate (TEGDMA) and trimethylolpropane trimethacrylate (TMPTMA). In one advantageous variant of this method, the first (meth)acrylate monomer is ethylene glycol dimethacrylate (EGDMA).

The second (meth)acrylate monomer is selected from among allyl methacrylate (AMA), glycidyl methacrylate (GMA), lauryl methacrylate (LMA), butyl methacrylate (BMA), 2-hydroxyethyl methacrylate (HEMA), polyethylene glycol diacrylate (PEGDA), polyethylene glycol dimethacrylate (PEGDMA), bisphenol A-glycidyl methacrylate (bis-GMA) and hexyl acrylate (HA).

Bisphenol A-glycidyl methacrylate (bis-GMA) corresponds to 2,2-bis[4-(2-hydroxy-3-methacryloxyprop-1-oxy) phenyl]-propane (IUPAC name).

In one advantageous variant of this preparation method, the second (meth)acrylate monomer is allyl methacrylate (AMA).

Advantageously, the polymerizable anchoring composition and the polymerizable monolith synthesis composition used respectively at steps (i) and (ii), comprise one same (meth)acrylate monomer selected from among ethylene glycol dimethacrylate (EGDMA), 1,4-butanediol diacrylate (BDA), triethylene glycol dimethacrylate (TEGDMA) and trimethylolpropane trimethacrylate (TMPTMA).

By using one same (meth)acrylate monomer in the polymerizable anchoring composition and in the polymerizable monolith synthesis composition, it is possible to maintain homogeneity of the polymeric structure of the inner wall as far as the centre of the chromatography column. By so doing, the solidity of the anchoring of the stationary phase in the chromatography column and the retention properties of this stationary phase are simultaneously optimized.

In one advantageous variant of this method, the (meth) acrylate monomer of the polymerizable anchoring composition and of the polymerizable monolith synthesis composition is ethylene glycol dimethacrylate (EGDMA).

The pore forming agent(s) of the polymerizable monolith synthesis composition can be selected from among methanol, 1-propanol, 2-propanol, cyclohexanol, dodecanol, 1,4-butanediol, isooctane, toluene, hexane, tetrahydrofuran or acetonitrile.

In one advantageous variant of the preparation method of the invention, the polymerizable monolith synthesis composition comprises two pore-forming agents, optionally in a mixture with water.

In one preferable variant, the two pore-forming agents of the polymerizable monolith synthesis composition are a monoalcohol and a diol.

In particular, the monoalcohol can be selected from among methanol, 1-propanol, 2-propanol, cyclohexanol and dodecanol.

Preferably, this monoalcohol is 1-propanol.

The diol can particularly be selected from among 1,3-propanediol, 1,4-butanediol, 1,5-pentanediol and 1,6-hexanediol.

Preferably, this diol is 1,4-butanediol.

Further preferably, the pore-forming agents are formed of a mixture of water, 1-propanol and 1,4-butanediol.

The radical polymerization initiator of the polymerizable monolith synthesis composition can be selected from among radical polymerization initiators conventionally used to prepare (meth)acrylate monolithic stationary phases, namely azobisisobutyronitrile (AIBN), benzophenone, 2,2-diethoxyacetophenone (DEA), α-dialkoxyacetophenones, 2,2-dimethyl-2-hydroxyacetophenone (DARO), α-hydroxyacetophenones, benzoin methyl ether (BME), 2-methyl-4'-(methylthio)-2-morpholino-propiophenone (IRG), α-alkylaminoacetophenones or 2,2-dimethoxy-2-phenylacetophenone (DMPA).

In one advantageous variant of the preparation method of the invention, the radical polymerization initiator of the polymerizable monolith synthesis composition is 2,2-dimethoxy-2-phenylacetophenone (DMPA).

By using DMPA as the same radical polymerization initiator in the polymerizable anchoring composition and in the polymerizable monolith synthesis composition, it is possible to simplify the method for preparing a monolithic stationary phase according to the invention, notably by limiting the number of compounds employed and the number of washing step(s).

Optimization of the preparation method of the invention is ensured by employing the same (meth)acrylate monomer, advantageously EGDMA, and solely DMPA as radical polymerization initiator in the polymerizable anchoring composition and in the polymerizable monolith synthesis composition.

In one variant of the preparation method of the invention, the mass proportion of pore-forming agent(s) relative to the total mass of the polymerizable monolith synthesis composition is between 40 mass % and 80 mass %, and advantageously between 50 mass % and 70 mass %.

In one variant of the preparation method of the invention, the mass proportion of radical polymerization initiator relative to the total mass of the polymerizable monolith synthesis composition is between 0.5 mass % and 12 mass %, and advantageously between 1 mass % and 5 mass %.

Evidently, the term "column" can cover any type of chromatography column, whether this column is formed of an open tube or on the contrary of a closed tube. However, in the context of the present invention, this term more particularly covers closed tubes such as channels, microchannels and other capillaries intended to equip the miniaturized systems or microsystems discussed in the foregoing.

Therefore, the preparation method of the invention more particularly targets columns having an inner diameter smaller than or equal to 5 mm, advantageously smaller than or equal to 1 mm, preferably of between 50 μm and 500 μm, and more preferably between 50 μm and 360 μm.

In one variant, the preparation method of the invention may additionally comprise a step (iv) of washing the monolithic stationary phase such as obtained after step (iii). This washing step (iv) allows removal of those compounds of the polymerizable monolith synthesis composition that have not reacted and of the pore-forming agent(s).

For this washing, methanol or ethanol can particularly be employed.

The present invention relates thirdly to a method for producing a chromatography column, in particular a separation or extraction chromatography column.

According to the invention, this production method comprises the following steps:

(1) preparing a monolithic stationary phase in the interior volume of the column by implementing the preparation method such as defined above, and (2) functionalizing the monolithic stationary phase prepared at step (1) by at least one extractant.

In this production method of the invention, step (1) is performed with the preparation method such as defined above, it being specified that the advantageous characteristics of this preparation method, such as those relating to the monomer(s), pore-forming agent(s) and DMPA, to their respective mass proportions and/or to steps (i) to (iii) and optionally (iv), can be taken alone or in combination.

Functionalization step (2), by at least one extractant, of the monolithic stationary phase prepared at the preceding step can be carried out via different routes.

One first route entails contacting the monolithic stationary phase prepared at step (1) with at least one extractant, this or these extractants being in liquid form, after which the monolithic stationary phase becomes impregnated with the extractant(s).

Impregnation of the extractant(s) is therefore obtained in the porous three-dimensional structure of this stationary phase via wet process and in situ, within the interior volume of the column.

For this impregnation, the extractant or the mixture of extractants must not degrade the monolithic stationary phase and must additionally be in liquid form.

A second route entails covalent grafting of the extractant(s) on the monolithic stationary phase prepared at step (1).

Said grafting can be obtained with a one-step method whereby one or more reactive functions $F_1$ belonging to the monolithic stationary phase are reacted with one or more reactive functions $F_2$ of the extractant(s), to obtain covalent binding of this or these extractants on the monolithic stationary phase via reaction between the reactive functions $F_1$ and $F_2$.

This grafting can also be obtained with a two-step method, in which:
- first, one or more reactive functions $F_1$ belonging to the monolithic stationary phase are reacted with one or more reactive functions $F_2$ of an organic compound comprising two different types of reactive functions, $F_2$ and $F_3$ respectively, to obtain covalent binding of this organic compound on the monolithic stationary phase via reaction between said reactive functions $F_1$ and $F_2$, and functionalization of the monolithic stationary phase with the reactive function(s) $F_3$; then
- reacting this or these reactive functions $F_3$ with one or more reactive functions $F_4$ of the extractant(s), to obtain covalent binding of this or these extractants on the organic compound via reaction between said reactive functions $F_3$ and $F_4$.

The extractant(s) able to be used in the production method of the invention are extractants conventionally employed for liquid-liquid extraction.

Among the extractants able to be used, particular mention can be made of tri-n-butyl phosphate (TBP), octylphenyl-N,N-diisobutylcarbamoylmethylphosphine oxide (CMPO), diamylamyl phosphonate (DAAP), p-amino-N,N-dihexyl acetamide (ADHA), alpha-hydroxyisobutyric acid (α-HIBA), di-bis-(2-ethylhexyl)malonamide (DB2EHM), di-2-ethylhexyl acetylamide (DEHAA), di-2-ethylhexyl butyramide (DEHBA), di-2-ethyhexyl isobutyramide (DE-HiBA), diglycolamide (DGA), di-isodecylphosphoric acid (DIDPA), N,N'-dimethyl-N,N'-dibutyl tetradecyl malonamide (DMDBTDMA), N,N'-dimethyl-N,N'-dioctyl-2-(2-hexyloxy-ethyl)-malonamide (DMDOHEMA), 4-ethoxy-N, N-di hexyl-buta namide (EDHBA), di-2-ethylhexyl phosphoric acid (DEHPA), N-(2-hydroxyethyl)-ethylenediamine triacetic acid (HEDTA), N,N,N',N'-tetra-2-ethylhexyl diglycolamide (T2EHDGA), tripodal diglycolamide (T-DGA), N,N,N',N'-tetraoctyl diglycolamide (TODGA), trialkyl phosphates (TRPO), crown ethers and calixarenes. Calixarenes can be functionalized by a diglycolamide: for example particular mention can be made of calix[4]arene functionalized by a diglycolamide (C4DGA).

The extractants TBP and DAAP are more particularly employed to extract actinides, especially uranium(VI) or thorium(IV).

With the method of the invention, it is therefore possible very easily and in customized manner to produce a chromatography column that can be used to extract, separate and/or purify elements contained in a solution.

The chromatography columns able to be obtained with the method of the invention can therefore be of most varied type and usable in numerous applications such as analysis and/or separation of elements, and in numerous fields, e.g. hydrometallurgy or environmental analysis.

The present invention fourthly relates to a method for chromatographic separation of elements of an acid aqueous solution S, in particular of an acid aqueous solution comprising nitric acid or hydrochloric acid.

According to the invention, this chromatographic separation method comprises the following steps:
- (A) at least one circulation of a mobile phase consisting of the acid aqueous solution S over a monolithic stationary phase of a chromatography column produced by implementing the production method such as defined above, and
- (B) at least one elution of the monolithic stationary phase obtained after step (A) with a mobile phase consisting of an eluting aqueous solution, whereby some or all of the elements are recovered in the eluting aqueous solution.

In the foregoing and in the remainder hereof, by the expression "element" it is meant any chemical element listed in Mendeleev's periodic table of elements.

In this chromatographic separation method of the invention, step (A) uses a functionalized monolithic stationary phase obtained with the production method defined above, it being specified that the advantageous characteristics of this production method and in particular those relating to the conditions for implementing steps (1) and (2), can be taken alone or in combination.

At this step (A), takes place the retention of those element(s) contained in the acid aqueous solution S which have affinity for the extractant(s) impregnated in or grafted on the monolithic stationary phase.

The elements) retained at step (A) are stripped (back-extracted) from the monolithic stationary phase by implementing step (B) which comprises a least one elution by a mobile phase consisting of an eluting aqueous solution. Said eluting aqueous solution can notably be a basic aqueous solution.

In one variant of the invention, the acid aqueous solution S has a concentration of $H^+$ ions lower than or equal to 10 mol/L.

This concentration of $H^+$ ions in the acid aqueous solution is advantageously between 0.1 mol/L and 8 mol/L, and preferably between 1 mol/L and 6 mol/L.

The separation method of the invention is particularly easy to implement and allows the selective separation, extraction and/or recovery of elements as a function of their affinity for the extractant(s) impregnated on the monolithic stationary phase of the chromatography column.

Other characteristics and advantages of the invention will become apparent on reading the following additional description given with reference to appended FIGS. 1 and 2, and which relates to examples of surface modification of a COC substrate conforming to the method of the invention, to examples of preparation of monolithic stationary phases, one conforming to the invention and the other conforming to publication [1], and to examples of separation allowing illustration of the performance of the monolithic stationary phase prepared and impregnated with TBP in a separation method of two actinides (thorium and uranium) and of one lanthanide (europium) initially contained in an aqueous solution comprising nitric acid.

These examples are evidently solely given to illustrate the subject of the invention and are not in any manner limiting in respect of this subject.

DETAILED DESCRIPTION OF PARTICULAR EMBODIMENTS

1. Surface Modification of a COC Plate

A polymerizable anchoring composition was prepared by mixing 160 mg of ethylene glycol dimethacrylate (EGDMA), 80 mg of 2,2-dimethoxy-2-phenylacetophenone (DMPA) and 850 mg of ethanol.

The polymerizable anchoring composition thus prepared was deposited on a substrate formed by a plate in cyclic olefin copolymer, this COC being marketed under reference Topas® 6013 by Topas Advanced Polymers GmbH. This plate having a width of 21 cm, a length of 29.7 cm and a thickness of 381 µm, was previously rinsed with ethanol.

Figure 1:
FIG. 1 corresponds to an image obtained with a scanning electron microscope (SEM) of the monolithic stationary phase prepared in accordance with the protocol described below.

The plate thus coated was placed in an oven under ultraviolet radiation (UV) at a wavelength of 365 nm for 20 min to obtain polymerization of the composition. FIG. 1 gives the image such as obtained with a scanning electron microscope (SEM) of this monolithic stationary phase thus prepared and then deposited, this image having been processed using ImageJ software. Surface modification of the substrate formed by the COC plate can be clearly seen, with the presence on this surface of nodules forming a monolithic stationary phase.

2. Preparation of Monolithic Stationary Phases within the Interior Volume of a COC Column

2.1. Monolithic Stationary Phase Prepared in Accordance with the Method of the Invention The polymerizable anchoring composition prepared in accordance with paragraph 1. above was injected at a flow rate of 1.2 mL/h and for 10 min, into a microchannel in COC, this microchannel having an outer diameter of 4 mm, a length of 25 mm and a depth of 360 µm.

After the 10 min, the excess polymerizable anchoring composition was evacuated so as only to leave behind a film of polymerizable anchoring composition on the inner wall of the microchannel.

Polymerization of this film of polymerizable anchoring composition was then carried out via photochemical route under UV radiation at a wavelength of 365 nm for 1 h. The microchannel thus obtained comprises a modified inner wall.

A polymerizable monolith synthesis composition was then prepared comprising:
- 20 mass % allyl methacrylate (AMA),
- 20 mass % ethylene glycol dimethacrylate (EGDMA),
- 33 mass % 1-propanol,
- 24 mass % 1,4-butanediol,
- 2 mass % water, and
- 1 mass % 2,2-dimethoxy-2-phenylacetophenone (DMPA).

This polymerizable monolith synthesis composition was injected into the microchannel having the modified inner wall.

After polymerization of this polymerizable monolith synthesis composition under UV radiation at a wavelength of 365 nm for 10 min, a chromatography column was obtained denoted $Col_{inv}$.

2.2. Monolithic Stationary Phase Prepared in Conformity with the Method Described in Publication [1]

A polymerizable composition of the type described for preparing the second monolith described on page 1682, left column in publication [1], was prepared from a mixture comprising the following compounds in the volume percentages specified below:
- 30% glycidyl methacrylate (GMA),
- 10% ethylene glycol dimethacrylate (EGDMA),
- 35% 1-propanol,
- 20% 1,4-butanediol, and
- 5% water.

To the mixture thus prepared, azobisisobutyronitrile (AIBN) was added as radical polymerization initiator in a mass proportion of 2.5% relative to the total mass of methacrylate monomers GMA and EGDMA.

The polymerizable composition thus obtained was injected into the same microchannel in COC as the one described in paragraph 2.1. above.

After polymerization of this polymerizable composition following a protocol similar to one described above for the coated COC plate (UV radiation at 365 nm wavelength for 30 min), a chromatography column was obtained denoted $Col_{ref}$.

3. Chromatographic Separations

The chromatography columns $Col_{inv}$ and $Col_{ref}$ were impregnated with tri-n-butyl phosphate (TBP).

Impregnation of the monolithic stationary phases was obtained by circulating pure TBP in each of the columns $Col_{inv}$ and $Col_{ref}$ for 2 h at a flow rate of 0.3 mL/h (5 µL/min). The monolithic stationary phases impregnated with TBP were rinsed by circulating distilled water for 7 min at a flow rate of 1 mL/h (17 µL/min).

In each of these columns $Col_{inv}$ and $Col_{ref}$, was introduced a sample formed of 72.8 µL of an aqueous solution S containing nitric acid at a concentration of 5 mol/L (5 M), and europium, thorium and uranium, in the following contents:
- [Eu]=2.5 ppm,
- [Th]=8.9 ppm, and
- [U]=10 ppm.

After depositing the sample, the stationary phase of each of the columns was washed with a mobile phase formed by 5 mol/L nitric acid solution at a flow rate of between 0.15 and 0.2 mL/h.

3.1 Chromatographic Separation with Column $Col_{Ref}$

The eluate collected at the outlet of column $Col_{ref}$ after the above-mentioned washing step, contained not only europium Eu, which is an element not having affinity for the stationary phase impregnated with TBP, but also thorium and uranium, which are two elements which should have been retained by the TBP-impregnated monolithic stationary phase.

The presence of these two elements in the eluate translates the weak anchoring of the monolithic stationary phase on the wall of the microchannel, weak anchoring which allows leakage of the aqueous solution S, and hence of all the elements contained therein, along the inner wall of the microchannel.

The separation of the three elements Eu, Th and U is of lesser quality or even becomes impossible.

3.2 Chromatographic Separation with Column $Col_{inv.}$

The eluate collected at the outlet of column $Col_{inv.}$ after the above-mentioned washing step contained europium Eu as sole eluted element, Eu not having affinity for the TBP-impregnated stationary phase.

Elution of the element thorium Th was then obtained with a change in eluting phase which was replaced by an aqueous 4 mol/L nitric acid solution.

Finally, elution of the uranium element was obtained by a further change in eluting phase which was replaced by an aqueous 1 mol/L nitric acid solution.

Figure 2:
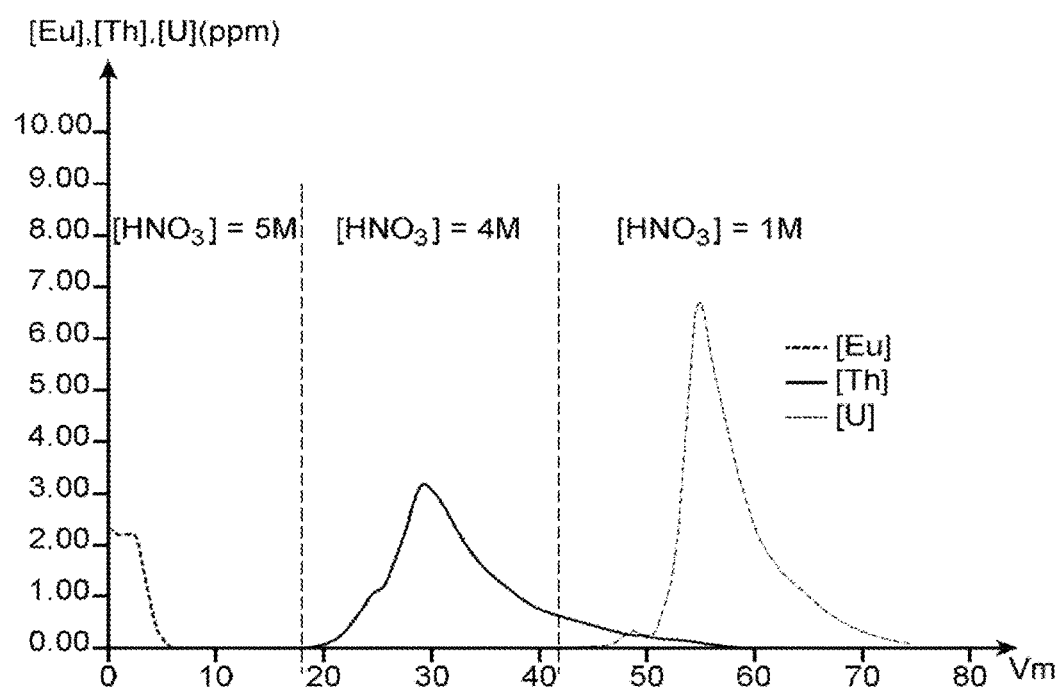
FIG. 2 gives the curves translating the changes in concentrations of europium, thorium and uranium found in the recovered eluates, respectively denoted [Eu], [Th] and [U] and expressed in ppm, as a function of the number of circulated dead volumes denoted Vm of eluting phases, after depositing the sample of aqueous solution S in the chromatography column conforming to the invention denoted $Col_{inv}$.

The successive elutions and separations are illustrated in appended FIG. 2 in which the curves translate the changes in concentrations of europium [Eu], thorium [Th] and uranium [U] found in the successively collected eluates, as a function of the number of dead volumes denoted Vm of the different washing and eluting phases that had successively been circulated, it being specified that 1 Vm=11.14 µL.

As shown in FIG. 2, the separation of the three elements Eu, Th and U is not only possible but also with high performance.

BIBLIOGRAPHY

[1] Y. Ladner et al., *Lab Chip*, 2012, 12, pages 1680-1685
[2] FR 2 978 153 A1
[3] J. M. Burke et al., *Biomicrofluidics*, 2012, 6, 016506

The invention claimed is:

1. A method for producing a chromatography column, the method comprising:
   (1) preparing a monolithic stationary phase within the interior volume of the chromatography column, the chromatography column comprising a thermoplastic polymer, by implementing the following successive steps (i) to (iii):
      (i) modifying an inner wall of the chromatography column by implementing the following successive steps (a) to (c):
         (a) preparing a polymerizable anchoring composition comprising:
            at least one (meth)acrylate monomer selected from the group consisting of ethylene glycol dimethacrylate, 1,4-butanediol diacrylate, triethylene glycol dimethacrylate, and trimethylolpropane trimethacrylate,
            one or more solvents, and
            2,2-dimethoxy-2-phenylacetophenone,
         (b) depositing, on the inner wall of the chromatography column, the polymerizable anchoring composition prepared at step (a), and
         (c) polymerizing the polymerizable anchoring composition via ultraviolet radiation:
      (ii) placing a polymerizable monolith synthesis composition in the interior volume of the chromatography column, the polymerizable monolith synthesis composition comprising:
         a first (meth)acrylate monomer selected from the group consisting of ethylene glycol dimethacrylate, 1,4-butanediol diacrylate, triethylene glycol dimethacrylate, and trimethylolpropane trimethacrylate,
         a second meth(acrylate) monomer selected from the group consisting of methacrylate, methacrylate, lauryl methacrylate, butyl methacrylate, 2-hydroxyethyl methacrylate, polyethylene glycol di(meth)acrylate, bisphenol A-glycidyl methacrylate, and hexyl acrylate,
         one or more pore-forming agents, and
         a radical polymerization initiator; and
      (iii) polymerizing the polymerizable monolith synthesis composition, and
   (2) functionalizing the monolithic stationary phase prepared at (1) by at least one extractant.

2. The production method according to claim 1, wherein the thermoplastic polymer of the chromatography column is selected from the group consisting of a poly(methyl methacrylate), a polyethylene, a polypropylene, and a cyclic olefin copolymer.

3. The production method according to claim 1, wherein, at step (a), the at least one (meth)acrylate monomer is ethylene glycol dimethacrylate.

4. The production method according to claim 1, Wherein, at step (a), the one or more solvent is at least one selected from the group consisting of methanol, ethanol, 1-propanol, 1,4-butanediol, cyclohexanol, 1-decanol, acetonitrile, toluene, and iso-octane.

5. The production method according to claim 1, wherein, at step (a), the mass proportion of the one or more solvents relative to the total mass of the polymerizable anchoring composition is between 50 mass % and 90 mass %.

6. The production method according to claim 1, wherein, at step (a), the mass proportion of 2,2-dimethoxy-2-phenylacetophenone relative to the total mass of the polymerizable anchoring composition is between 5 rims % and 15 mass %.

7. The production method according to claim 1, wherein the wavelength of ultraviolet radiation applied at step (c) is between 320 nm and 400 nm.

8. The production method according to claim 1, wherein, at step an ultraviolet irradiation time is between 5 min and 80 min.

9. The production method according to claim 1, wherein step (b) is implemented by at least one circulation of the polymerizable anchoring composition prepared at step (a) within the interior volume of the chromatography column.

10. The production method according to claim 1, wherein the polymerizable anchoring composition used at step (i) and the polymerizable monolith synthesis composition used at step (ii) comprise one same (meth)acrylate monomer.

11. The production method according to claim 1, Wherein the inner diameter of the chromatography column is smaller than or equal to mm.

12. The production method according to claim 1, wherein the functionalization step (2) is implemented by contacting the monolithic stationary phase prepared at step (1) with the at least one extractant in liquid from whereby impregnation of the monolithic stationary phase with the at least one extractant is obtained.

13. The production method according to claim 1, wherein the functionalization step (2) is performed by covalent grafting of the at least one extractant the monolithic stationary phase prepared at step (1).

14. A method for chromatographic separation of elements of an acid aqueous solution S, the method comprising:
   (A) performing at least one circulation of a mobile phase consisting of the acid aqueous solution S over a monolithic stationary phase of a chromatography column produced by implementing the method according to claim 1; and
   (B) performing at least one elution, with a mobile phase consisting of an eluting aqueous solution, of the monolithic stationary phase obtained after step (A), whereby some or all of the elements are recovered in the eluting aqueous solution.

15. The chromatographic separation method according to claim 14, wherein the aqueous solution S has a concentration of $H^+$ ions lower than or equal to 10.

* * * * *